(No Model.)
L. S. FRANKLIN.
HORSE CHECKING DEVICE.
No. 502,092. Patented July 25, 1893.
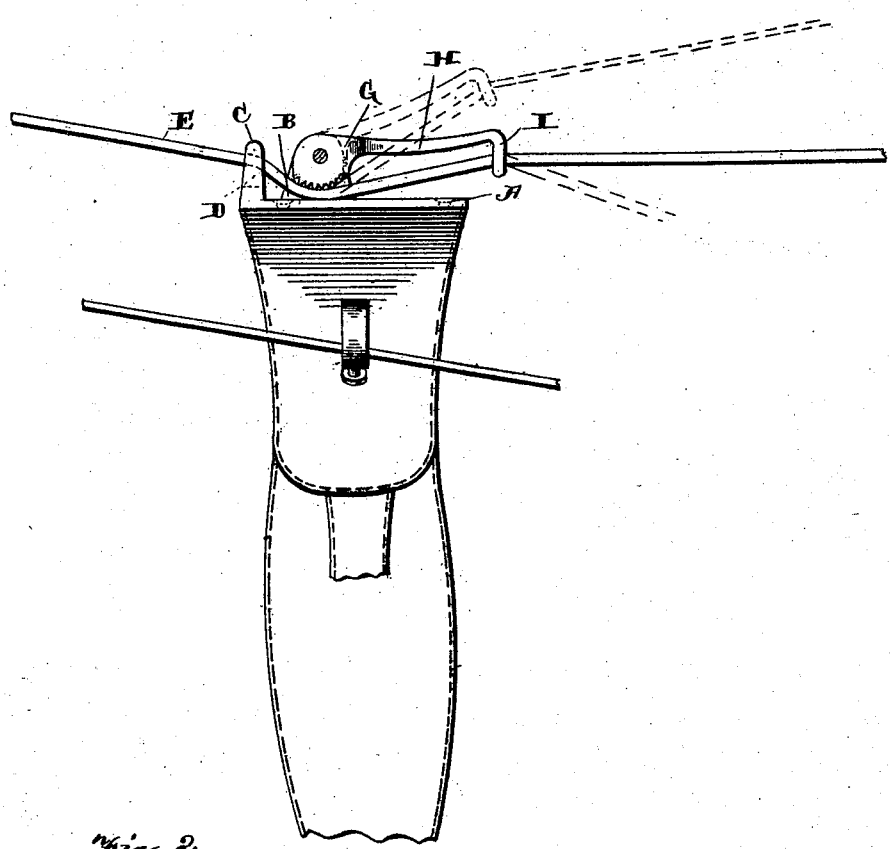
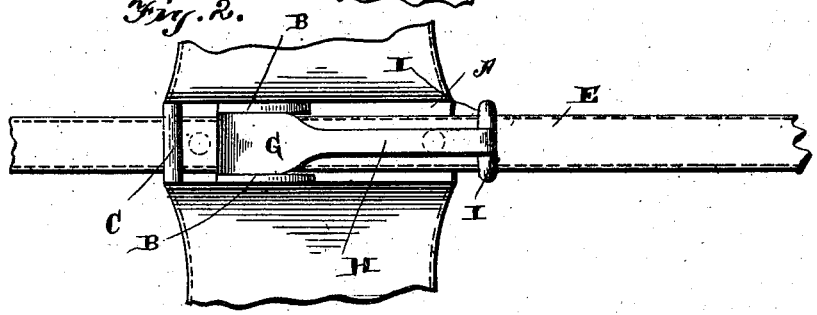

UNITED STATES PATENT OFFICE.

LEWIS S. FRANKLIN, OF PARKERSBURG, WEST VIRGINIA, ASSIGNOR TO ELLA F. FRANKLIN, OF SAME PLACE.

HORSE-CHECKING DEVICE.

SPECIFICATION forming part of Letters Patent No. 502,092, dated July 25, 1893.

Application filed January 10, 1893. Serial No. 457,959. (No model.)

*To all whom it may concern:*

Be it known that I, LEWIS S. FRANKLIN, of Parkersburg, in the county of Wood and State of West Virginia, have invented certain new and useful Improvements in Horse-Checking Devices; and I do hereby declare the following to be a full, clear, and exact description of the invention, such as will enable others skilled in the art to which it pertains to make and use it, reference being had to the accompanying drawings, which form part of this specification.

My invention relates to an improvement in horse checking devices; and it consists in the novel manner in which the rein is let down and taken up by the driver without leaving his seat in the vehicle as will be more fully described hereinafter and particularly referred to in the claims.

Referring to the accompanying drawings,—Figure 1 is a side elevation of my improved device showing its position on the harness. Fig. 2 is a plan view of the same.

A designates a base plate secured to the harness saddle; and B, bearings projecting vertically from opposite sides thereof. Upon the front end of the plate A, is the projection C, having slot D through which the line E, passes which at its forward end is connected to the check rein.

Pivoted between the bearings B, is the cam or eccentric G and extending upward and rearward therefrom is the arm H and upon the outer end of this arm is the depending slotted extension I through which the line E, passes on its way rearward to the vehicle, to which it may be secured at any point within convenient reach of the driver. When the arm H, is raised the line E, is free to pass beneath the cam G, so that in reining up the horse the operator exerts a rearward pull on the line E, and when it has been made sufficiently tight a downward pull on the said line lowers the arm H, thus causing the cam G, to clamp the line and hold it securely from forward movement until released.

The device is most simple in operation and is very convenient for watering the horse as the driver may remain in his seat in checking and unchecking the animal. The biting edge of the cam G, is preferably serrated so as to secure a firm hold on the strap.

Having thus fully described my invention, what I claim as new, and desire to secure by Letters Patent, is—

1. The combination of a base plate, bearings extending therefrom, a cam pivoted between the bearings, an arm extended rearward from the cam having a slot in its outer end, and a check rein operating line adapted to pass beneath the cam and through the slot, substantially as shown and described.

2. The combination of a base plate, bearings B, made integral with and extending vertically from opposite sides thereof, slotted projection C, on the forward end of the plate, a cam pivoted between the bearings, an arm extending rearward from the cam having a slot in its outer end, and a check rein operating line adapted to pass beneath the cam and through the slot, substantially as shown and described.

In testimony whereof I affix my signature in presence of two witnesses.

LEWIS S. FRANKLIN.

Witnesses:
W. S. BARR,
MOSES PELCHER.